United States Patent Office 2,812,333
Patented Nov. 5, 1957

2,812,333

PROCESS FOR THE PREPARATION OF 1-(2-HYDROXYETHYL)IMIDAZOLIDINE-2

Arthur B. Steele, Pittsburgh, Pa., assignor to Union Carbide Corporation, a corporation of New York No Drawing. Application September 27, 1954,
Serial No. 458,695

11 Claims. (Cl. 260—309.7)

This invention relates to a process for the preparation of organic nitrogen-containing compounds and, more particularly, to a novel process for the preparation of N-(2-hydroxyethyl) ethylene diamine and intermediates in the production thereof.

The process of this invention is based on the discovery that 2-aminoethanol and carbon dioxide react under the influence of an elevated temperature and elevated pressure to yield 1-(2-hydroxyethyl)imidazolidone-2 which is subsequently hydrolyzed to form N-(2-hydroxyethyl) ethylene diamine.

Heretofore, the methods utilized for both laboratory and commercial production of N-(2-hydroxyethyl) ethylene diamine consisted of the reaction of ethylene diamine and ethylene chlorohydrin or ethylene oxide. Although these methods have been employed commercially, they have some major shortcomings; namely, that ethylene diamine is a relatively expensive starting material and a large excess of ethylene diamine must be employed in the reaction to prevent the conversion of significant amounts of the amine to di-, tri- and tetra-(2-hydroxyethyl) ethylene diamines. Unless such an excess is used, the efficiency of the process is reduced.

The reaction whereby the N-(2-hydroxyethyl)ethylene diamine can be prepared from 2-aminoethanol and carbon dioxide is illustrated by the following equations:

(Ia) In the presence of water:

$$2HOC_2H_4NH_2 + CO_2 + H_2O \longrightarrow (HOC_2H_4NH_3)_2CO_3$$
2-aminoethanol        Carbonate salt of
                      2-aminoethanol (Ib) In the absence of water:

$$2HOC_2H_4NH_2 + CO_2 \longrightarrow HOC_2H_4NHCO_2NH_3C_2H_4OH$$
N-(2-hydroxyethyl) carbamate
salt of 2-aminoethanol (II)

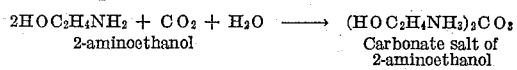

(III)

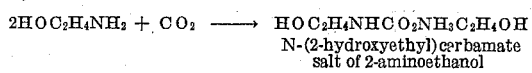

(III)

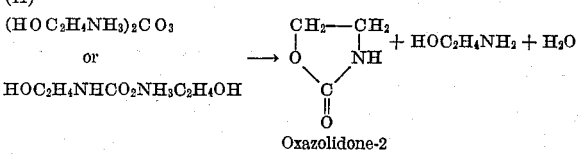

1-(2-hydroxyethyl) imidazolidone-2

(IV)

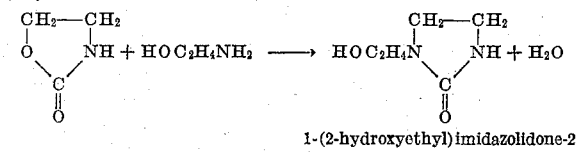

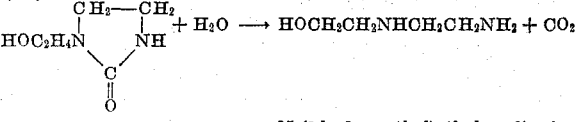

N-(2-hydroxyethyl)ethylene diamine

In the process, monoethanolammonium carbonate is formed by the simple addition of carbon dioxide to aqueous monoethanolamine. At elevated temperatures and under pressure, the carbonate salt is converted to 1-(2-hydroxyethyl)imidazolidone-2 which is hydrolyzed to N-(2-hydroxyethyl)ethylene diamine. It is postulated that the carbonate salt of 2-aminoethanol is first converted to oxazolidone-2 which, in the presence of 2-aminoethanol, reacts to form the substituted imidazolidone through an ester-amide interchange reaction. Because of its high reactivity, oxazolidone-2 is seldom isolated from the reaction system.

As set forth above, the process of this invention provides for the conjoint use of an elevated temperature and an elevated pressure. The minimum temperature necessary to provide a significant yield of N-(2-hydroxyethyl) ethylene diamine and its precursor, 1-(2-hydroxyethyl) imidazolidone-2 is about 135° C. while an elevated pressure of at least 150 pounds per square inch absolute will suffice. Pressures in the range of from 150–1000 pounds per square inch absolute and more particularly from 200–600 pounds per square inch absolute are preferred. The only practical limitation on the upper limit of pressure is the type of equipment being used.

In carrying out the process, 2-aminoethanol can be employed either undiluted or diluted with suitable solvents such as water or diethylene glycol. Water is the preferred diluent because of its low cost, ease of removal from the products of the reaction and its excellent solvent power for both reactants and products. The strong solvent power of water for the reactants is thought to account for the improved conversions to 1-(2-hydroxyethyl) imidazolidone-2 which are realized when the reactions are carried out in aqueous solution.

The 2-aminoethanol, alone or in solution, can be charged to an autoclave and carbon dioxide bubbled into the amine until a saturated solution is attained. If desired, the carbonate salt or the carbamate salt may be prepared in a separate operation and then charged to the autoclave. The reaction product of 2-aminoethanol and carbon dioxide (Equations Ia and Ib, above) can then be heated to the desired temperature and pressure to allow the reaction to proceed.

The pressure desired during the heating stage may be that pressure which is derived mostly from the decomposition of the monoethanolamine carbonate or can be the pressure resulting from the imposition of any other gas such as carbon dioxide, nitrogen and the like to effect the pressure required for the reaction to proceed in the direction desired. As a matter of practical convenience, however, it is desirable that the 2-aminoethanol be charged to an autoclave and pressured with carbon dioxide to effect the pressure desired.

Although the 2-aminoethanol and carbon dioxide can be reacted in any desired mole ratio, practical success, from a yield point of view, requires that equivalent to equimolar proportions of reactants be employed.

Although it is difficult to isolate oxazolidone-2 from the products of the high-temperature reaction between 2-aminoethanol and carbon dioxide, 1-(2-hydroxyethyl) imidazolidone-2 can be isolated in good yield and at high efficiencies based on the 2-aminoethanol. Thus one phase of the process of this invention includes a process for the production of 1-(2-hydroxyethyl) imidazolidone-2 which comprises reacting 2-aminoethanol and carbon dioxide in a pressure resistant vessel at a temperature of at least 135° C.

The hydrolysis of 1-(2-hydroxyethyl) imidazolidone-2 is carried out by heating the 1-(2-hydroxyethyl) imidazolidone-2 in the presence of water at an elevated temperature sufficient to cause hydrolytic cleavage. Since the hydrolysis reaction is a reversible reaction, it is necessary naturally, to remove the carbon dioxide as it is formed in any convenient manner such as venting to the atmosphere. The yield of N-(2-hydroxyethyl)ethylene diamine, of course, will depend on the carbon dioxide pressure maintained on the system and the temperature of the hydrolysis reaction. Generally, any pressure less than the pressure necessary for the reaction to proceed in the opposite direction will suffice.

1-(2-hydroxyethyl) imidazolidone-2 can be saponified to N-(2-hydroxyethyl)ethylene diamine by heating in the presence of aqueous alkali such as sodium hydroxide; saponification is quantitative.

The influence of pressure on the course of the reaction is demonstrated by a study of the effect of temperature and pressure on the rate of the reaction. For example, when aqueous solutions of 2-aminoethanol containing from 5 percent to 99 percent free base, by weight, were saturated with carbon dioxide at 25° C. and the saturated solutions regenerated by heating over a temperature range of 100° C. to 170° C., at atmospheric pressure 2-aminoethanol was recovered unchanged and no residues were produced, whereas, heating of monoethanolammonium carbonate solutions in closed systems provided significant conversion of the 2-aminoethanol to 1-(2-hydroxyethyl) imidazolidone-2 at temperatures in excess of 135° C.

The following examples will serve to illustrate the general procedure of the process of this invention:

EXAMPLE I

A 20 percent solution of 2-aminoethanol was saturated with carbon dioxide at 25° C. and the solution sealed in a stainless steel pressure autoclave. After heating at the desired temperature for 5 hours, the autoclave was cooled to 25° C. and the contents discharged and fractionally distilled to determine the amount of 2-aminoethanol unchanged and the amount converted to 1-(2-hydroxyethyl) imidazolidone-2 and N-(2-hydroxyethyl) ethylene diamine. The data are present in the following Table I:

Table I.—Conversion of 2-aminoethanol to 1-(2-hydroxyethyl) imidazolidone-2

| Experiment Number | Temperature, °C. | Initial Pressure, p. s. i. (gauge) | Final Pressure, p. s. i. (gauge) | 2-Aminoethanol Converted, percent | |
|---|---|---|---|---|---|
| | | | | To 1-(2-Hydroxyethyl) imidazolidine-2 | To N-(2-Hydroxyethyl) ethylene diamine |
| 1 | 100 | 200 | 200 | Trace | Trace |
| 2 | 110 | 220 | 210 | Trace | Trace |
| 3 | 120 | 240 | 240 | Trace | Trace |
| 4 | 130 | 270 | 255 | Trace | Trace |
| 5 | 135 | 340 | 340 | Trace | Trace |
| 6 | 140 | 480 | 420 | 4 | Trace |
| 7 | 145 | 500 | 430 | 7 | 0.5 |
| 8 | 150 | 530 | 480 | 14 | 1.4 |
| 9 | 160 | 570 | 500 | 18 | 2.0 |
| 10 | 165 | 600 | 480 | 25 | 2.8 |

Thus, as may be observed, the rate of conversion of carbon dioxide and 2-aminoethanol to 1-(2-hydroxyethyl) imidazolidone-2 appears to be negligible at temperatures below 135° C. At higher temperatures, the extent of conversion is governed by the temperature and by the amount of carbon dioxide dissolved in the 2-aminoethanol in the form of the monoethanolammonium carbonate. The concentration of the monoethanolammonium carbonate is governed, in turn, by the partial pressure of the carbon dioxide and the total pressure on the system at any given temperature.

EXAMPLE II

The 1-(2-hydroxyethyl) imidazolidone-2 hydrolyses in accordance with Equation III, set forth above, to produce N-(2-hydroxyethyl) ethylene diamine. In studies of the rate of hydrolysis of the 1-(2-hydroxyethyl) imidazolidone-2, a 12 percent solution of 1-(2-hydroxyethyl) imidazolidone-2 was heated at 175° C. in a sealed autoclave. Samples were withdrawn periodically and the rates of degradation of imidazolidone and of the concurrent production of the N-(2-hydroxyethyl) ethylene diamine were determined by titration and distillation. The data are presented in the following Table II:

Table II.—Rate of hydrolysis of 1-(2-hydroxyethyl) imidazolidone-2

| Reaction Time, hours | Concentration of 1-(2-Hydroxyethyl) imidazolidone-2, Percent by Weight | Concentration of N-(2-Hydroxyethyl) ethylene diamine, Percent by Weight |
|---|---|---|
| 0 | 12 | Nil |
| 1 | 11.4 | 0.47 |
| 2 | 10.8 | 0.93 |
| 3 | 10.3 | 1.3 |
| 4 | 9.8 | 1.7 |
| 5 | 9.3 | 2.1 |
| 6 | 8.85 | 2.5 |
| 7 | 8.45 | 2.7 |
| 8 | 8.05 | 3.15 |

These data indicate that the rate of hydrolysis of the substituted imidazolidone is appreciable; under conditions of the test, approximately 5 percent of the compound degraded per hour.

EXAMPLE III

In a parallel experiment similar to Example I, 2-aminoethanol containing only traces of water was saturated with carbon dioxide at 25° C. and the solution of monoethanolammonium carbonate was sealed in an autoclave and heated for 5 hours over a temperature range of 100° C. to 165° C. The conversion of anhydrous amine carbonate at 165° C. at 200 p. s. i. (gauge pressure) to 1-(2-hydroxyethyl) imidazolidone-2 was approximately 4 percent in five hours.

EXAMPLE IV

The reversibility of the hydrolysis reaction was demonstrated by the synthesis of 1-(2-hydroxyethyl) imidazolidone-2 from the condensation of N-(2-hydroxyethyl) ethylene diamine and carbon dioxide.

A 20 percent solution of N-(2-hydroxyethyl) ethylene diamine, in the form of its carbonate salt, was heated in a sealed autoclave for 5 hours at 175° C. (470 p. s. i.—gauge pressure). Approximately 50 percent of the substituted ethylene diamine was converted to the substituted imidazolidone.

What is claimed is:

1. A process for the preparation of 1-(2-hydroxyethyl) imidazolidone-2 which comprises reacting 2-aminoethanol and carbon dioxide and heating at an elevated temperature in the range of from 135° C. to 165° C. under a superatmospheric pressure in the range of from 200 to 600 pounds per square inch absolute.

2. A process for the preparation of 1-(2-hydroxyethyl) imidazolidone-2 which comprises reacting an aqueous solution of 2-aminoethanol and carbon dioxide and heating at an elevated temperature in the range of from 135° C. to 165° C. under a superatmospheric pressure in the range of from 200 to 600 pounds per square inch absolute.

3. A process for the preparation of 1-(2-hydroxyethyl) imidazolidone-2 which comprises saturating 2-aminoethanol with carbon dioxide and heating at an elevated temperature in the range of from 135° C. to 165° C. under a superatmospheric pressure in the range of from 200 to 600 pounds per square inch absolute.

4. A process for the preparation of 1-(2-hydroxyethyl) imidazolidone-2 which comprises saturating an aqueous solution of 2-aminoethanol and carbon dioxide and heating at an elevated temperature in the range of from 135° C. to 165° C. under a superatmospheric pressure in the range of from 200 to 600 pounds per square inch absolute.

5. A process for the preparation of 1-(2-hydroxyethyl)

imidazolidone-2 which comprises reacting N-(2-hydroxyethyl) ethylene diamine and carbon dioxide at an elevated temperature in the range of from 135° C. to 165° C. under a superatmospheric pressure in the range of from 200 to 600 pounds per square inch absolute.

6. A process for the preparation of N-(2-hydroxyethyl) ethylene diamine which comprises reacting 2-aminoethanol and carbon dioxide and heating at an elevated temperature in the range of from 135° C. to 165° C. under a superatmospheric pressure in the range of from 200 to 600 pounds per square inch absolute.

7. A process for the preparation of N-(2-hydroxyethyl) ethylene diamine which comprises reacting an aqueous solution of 2-aminoethanol and carbon dioxide and heating at an elevated temperature in the range of from 135° C. to 165° C. under a superatmospheric pressure in the range of from 200 to 600 pounds per square inch absolute.

8. A process for the preparation of N-(2-hydroxyethyl) ethylene diamine which comprises saturating 2-aminoethanol with carbon dioxide and heating at an elevated temperature in the range of from 135° C. to 165° C. under a superatmospheric pressure in the range of from 200 to 600 pounds per square inch absolute.

9. A process for the praparation of N-(2-hydroxyethyl) ethylene diamine which comprises saturating an aqueous solution of 2-aminoethanol and carbon dioxide and heating at an elevated temperature in the range of from 135° C. to 165° C. under a superatmospheric pressure in the range of from 200 to 600 pounds per square inch absolute.

10. A process for the preparation of N-(2-hydroxyethyl) ethylene diamine which comprises saturating 2-aminoethanol with carbon dioxide to produce the N-(2-hydroxyethyl) carbamate salt of 2-aminoethanol, heating said carbamate at an elevated temperature in the range of from 135° C. to 165° C. under a superatmospheric pressure in the range of from 200 to 600 pounds per square inch absolute to produce 1-(2-hydroxyethyl) imidazolidone-2 and hydrolysing said 1-(2-hydroxyethyl) imidazolidone-2 to produce N-(2-hydroxyethyl) ethylene diamine.

11. A process for the preparation of N-(2-hydroxyethyl) ethylene diamine which comprises saturating an aqueous solution of 2-aminoethanol with carbon dioxide to produce the ethanolammonium carbonate, heating said ethanolammonium carbonate at an elevated temperature in the range of from 135° C. to 165° C. under a superatmospheric pressure in the range of from 200 to 600 pounds per square inch absolute to produce 1-(2-hydroxyethyl) imidazolidone-2 and hydrolysing said 1-(2-hydroxyethyl) imidazolidone-2 to produce N-(2-hydroxyethyl) ethylene diamine.

References Cited in the file of this patent

UNITED STATES PATENTS

| | | |
|---|---|---|
| 2,436,311 | Larson et al. | Feb. 17, 1948 |
| 2,497,308 | Larson | Feb. 14, 1950 |

FOREIGN PATENTS

| | | |
|---|---|---|
| 622,955 | Great Britain | May 10, 1949 |
| 697,839 | Great Britain | Sept. 30, 1953 |
| 498,245 | Canada | Dec. 8, 1953 |

OTHER REFERENCES

Sheneerson et al.: Chem. Abstracts, vol. 41, col. 4340 (1947).

Schweitzer: J. Org. Chem., vol. 15, pp. 475–480 (1950).